Nov. 27, 1934.                E. F. NASH                 1,982,531
EGGBEATER
Filed Sept. 27, 1933
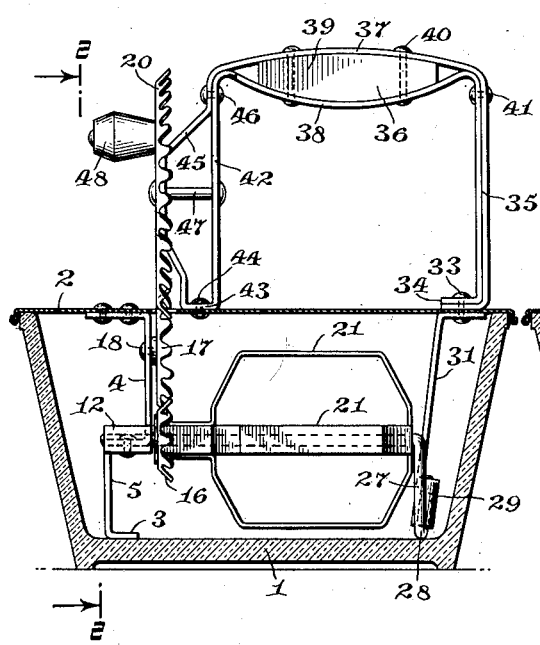
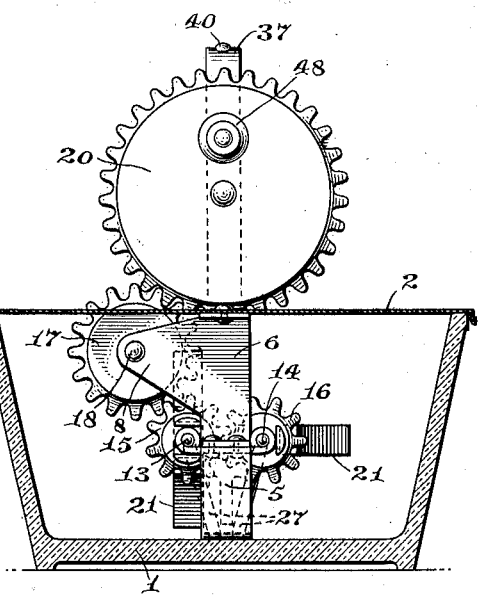
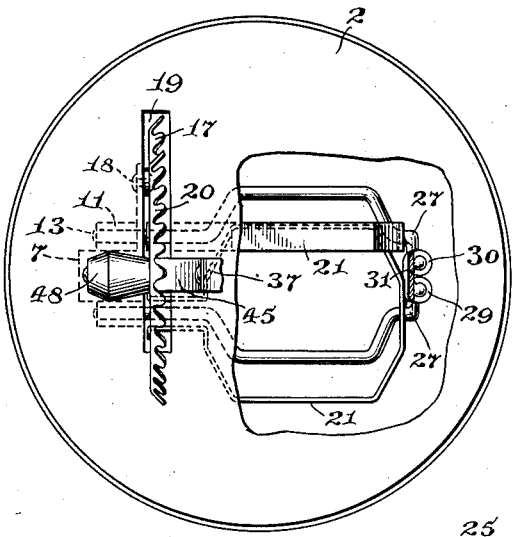
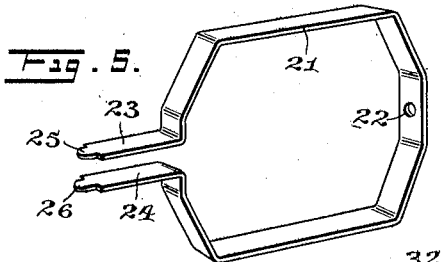
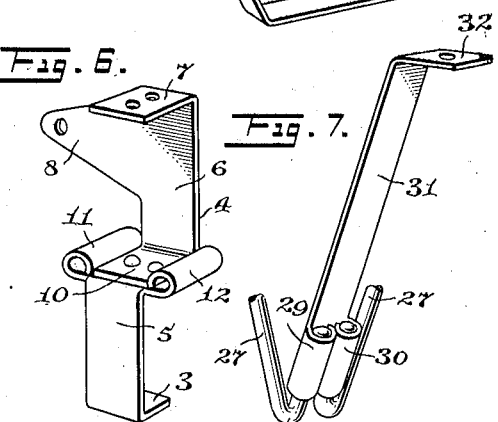
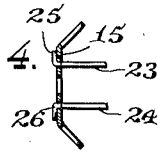
INVENTOR
Elizabeth F. Nash
BY
Munn, Anderson, Stanley,
Foster + Liddy   ATTORNEYS
WITNESSES Patented Nov. 27, 1934

1,982,531

UNITED STATES PATENT OFFICE 1,982,531

EGGBEATER

Elizabeth F. Nash, New York, N. Y.

Application September 27, 1933, Serial No. 691,200

2 Claims. (Cl. 259—119)

This invention relates to egg beaters and has for an object to provide an improved construction wherein the beating elements rotate around a horizontal axis.

Another object of the invention is to provide an egg beater with a container provided with a lid having a handle and means associated with the handle and lid for revolving a beater within the container.

An additional object is to provide an egg beater wherein the beating element rotates around a horizontal axis and a closed container with the closure connected with the beating elements with a handle and a power driven mechanism in order that all may function together and be applied to a container or removed therefrom simultaneously.

In the accompanying drawing,

Figure 1 is a longitudinal vertical sectional view through an egg beater disclosing an embodiment of the invention.

Figure 2 is a sectional view through Figure 1 approximately on line 2—2.

Figure 3 is a plan view of the structure shown in Figure 1, part of the cover and the handle being broken away for better illustrating the interior of the construction.

Figure 4 is a detailed fragmentary sectional view showing how one end of the beating element is mounted.

Figure 5 is an enlarged perspective view of one of the beating elements shown in Figure 1.

Figure 6 is an enlarged perspective view of one of the brackets shown in Figure 1.

Figure 7 is an enlarged perspective view of the other brackets shown in Figure 1.

Referring to the accompanying drawing by numerals, 1 indicates a container which may be crockery, glass or other material and which is made of a proper size to receive the cover 2 and to receive the mechanism of the beater below the cover 2 in such a way that the lower foot 3 of bracket 4 will rest on the bottom of the container at the time that the cover or lid 2 rests on the top edge. The bracket 4 is constructed as shown in Figure 6 and is provided with a foot 3 and a pair of upstanding sections 5 and 6, a top foot 7, a laterally apertured extension 8 and a central portion 10 formed from the turned over ends of sections 5 and 6. The turned over end of section 5 is provided with looped portions 11 and 12 for presenting tubular bearing members for the pintles 13 and 14 which carry the respective gear wheels 15 and 16. Gear wheel 16 is in continuous mesh with gear wheel 15 and gear wheel 15 in turn is in continuous mesh with gear wheel 17. Gear wheel 17 is mounted on a shaft or pintle 18 carried by the extension 8. Gear wheel 17 extends through a slot 19 in the cover so as to continually mesh with the power gear wheel 20 which power gear wheel also extends slightly through slot 19. In this way, whenever the power gear wheel 20 is rotated, movement will be transmitted to the gear wheels 15 and 16. Beaters 21 are connected with each of the gear wheels 15 and 16 but are arranged at right angles to each other as illustrated particularly in Figure 2 so that an efficient beating action is secured, whenever gear wheels 15 and 16 are rotated.

As shown in Figure 5, each of the beaters 21 is provided with a leg structure and an aperture 22 at one end and extending portions 23 and 24 at the opposite end. Portions 23 and 24 are provided with tongues 25 and 26 which extend through apertures in the respective gear wheels 15 and 16 as shown in Figure 4, said tongues being bent over or clinched to connect the beater to the gears. It will be noted that the gears are dish-shaped and are formed from sheet metal whereby an inexpensive and yet efficient gear mechanism is secured.

A pin 27 extends through the apertures 22 and a pin 27 for each of the beaters is provided, said pins extending through the respective apertures 22 and then downwardly to the bottom of the container 1 so that the loop 28 will be in contact with the container 1 after which they extend diagonally upwardly as shown in Figure 7 into the curled extensions 29 and 30 of bracket 31. Bracket 31 has a foot 32 at the upper end which is rigidly secured to the cover 2 by suitable rivet 33, which rivet also extends through the foot 34 of the leg 35 extending from handle 36. It will be noted that handle 36 is formed with outer or top strip 37 of metal and an inner or lower strip 38 of metal with a filling block 39 arranged therebetween and held in place by suitable rivets 40. The strips 37 and 38 for the leg 35 are rigidly held together by rivet 41 as well as the rivet 33. Opposite leg 35 a second leg 42 is provided formed from a downwardly extending extension of strip 38, said leg 42 having a foot 43 secured to the cover 2 by rivet 44. From the foot 43 the material extends upwardly and outwardly to form a bracket 45 which is riveted at 46 to the upper part of leg 42 and at 46 merges into the upper strip 37. It will be noted that the upper and lower strips 37 and 38 are formed from a single long strip of metal bent into the shape shown in Figure 1 including the bracket 45. A rivet or pin 47 extends through bracket 45, leg 42 and the center of the gear wheel 20 so as to act as an axle therefor.

A suitable knob or handle 48 is connected with gear wheel 20 so that this gear wheel may be rotated manually at any time. The gear wheel 20 is appreciably larger than the gear wheels 15 and 16 and consequently one rotation of gear wheel 20 will make the gear wheels 15 and 16 and beaters 21 rotate several times. It will be noted that the beaters 21 are mounted to rotate about a horizontal axis and that the longitudinal sections of the beaters 21 are substantially parallel with the bottom of the container 1 as illustrated particularly in Figure 1. In this way a greater beating action is secured than if the beaters were rounded, as the beaters coact with the container to secure the proper beating action.

I claim:

1. An egg beater including a container, a cover adapted to rest on top of said container, a beating element positioned to operate around a horizontal axis when in use and wholly within said container, a bracket at each end of said beating element, each of said brackets being rigidly connected at one end with said cover and at the other end positioned adjacent the bottom of said container, each of said brackets having a pair of curled portions presenting eye journal members, a pair of intermeshing pinions arranged adjacent one of said journal members, said means for journaling said beating elements comprising a pin extending through each of said pinions with the respective ends extending into said curled portions of said brackets, one end of each of said beating elements being connected to one of said pinions, and power means extending through said cover from a point above the container, said power means being formed to rotate said pinions when the beater is in use.

2. An egg beater including a container, a cover, a pair of beating elements positioned to operate around a horizontal axis when in use, a supporting bracket for said beating elements, said bracket being rigidly connected at one end to said cover and at the other end positioned adjacent the bottom of the container, said bracket having a pair of curled portions presenting eye journal members, a pair of intermeshing pinions arranged adjacent said journal members, a pin extending through each of said pinions and into said journal members, one end of each of said beating elements being connected to one of said pinions, said pins extending through the opposite end of the respective beating elements, means for supporting said pins at the opposite end of said beating elements, and power means for rotating said pinions when the beater is in use.

ELIZABETH F. NASH.